United States Patent [19]
Dunmire et al.

[11] 3,792,879
[45] Feb. 19, 1974

[54] TAPPING SLEEVE

[75] Inventors: Paul G. Dunmire, Oakland; Jack C. Standish, Fremont, both of Calif.

[73] Assignee: Johns-Manville Corporation, Arapahoe County, Colo.

[22] Filed: Jan. 11, 1973

[21] Appl. No.: 322,741

[52] U.S. Cl. .................. 285/197, 251/146, 137/318
[51] Int. Cl. ............................................. F16l 41/06
[58] Field of Search .... 251/146; 285/197, 198, 199; 137/318

[56] References Cited
UNITED STATES PATENTS
3,558,162  1/1971  Ferrai et al. ..................... 285/197 X
3,471,176  10/1969  Gilchrist ......................... 285/197 X
2,684,859  7/1954  Longley .............................. 285/199
3,622,184  11/1971  Deasy et al. ......................... 285/197

*Primary Examiner*—William R. Cline
*Attorney, Agent, or Firm*—Flehr, Hohbach, Test, Albritton & Herbert

[57] ABSTRACT

Tapping sleeve for connecting a lateral or branch line to a pipe. The sleeve has a radially extending outlet and a plurality of semi-flexible bands which extend circumferentially around the pipe. Adjacent ends of the bands are drawn together by bolts to clamp the sleeve to the pipe and hold the outlet in alignment with an opening in the side of the pipe.

6 Claims, 3 Drawing Figures

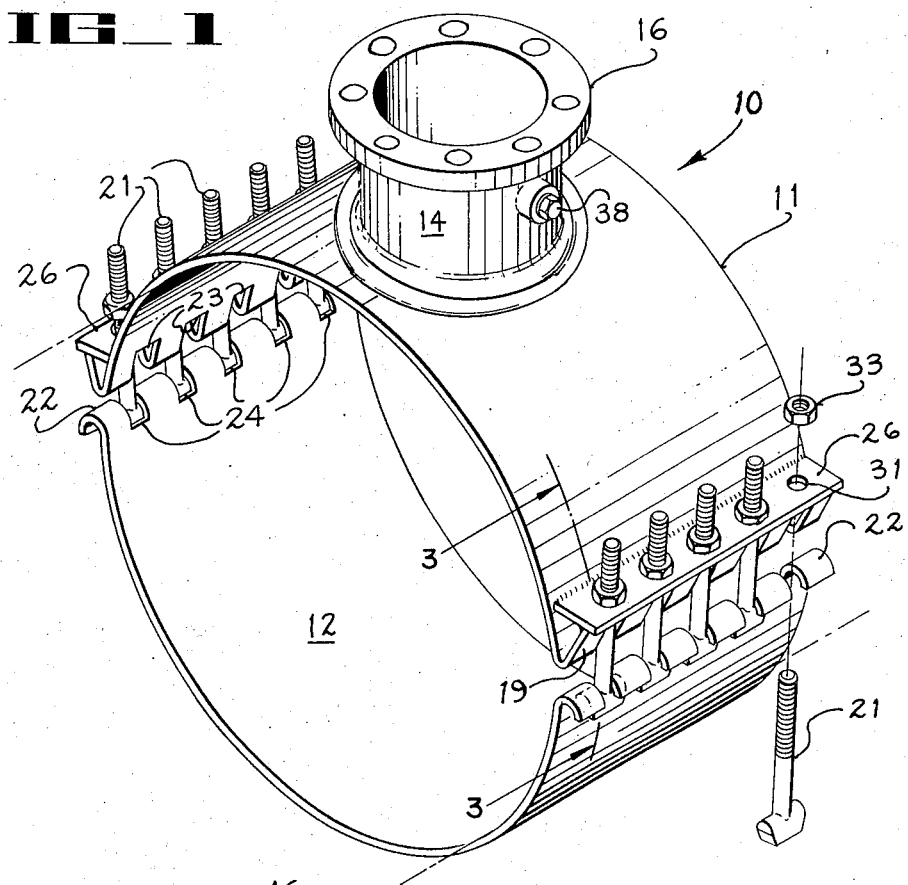

TAPPING SLEEVE

BACKGROUND OF THE INVENTION

This invention pertains to an improved tapping sleeve for fluid conduit systems.

In connecting a large concrete, asbestos cement, steel or cast iron pipe, such as the type often used for transmission of fluids (sewer lines or water mains), with side lines or laterals, or other branching connections, a large tapping sleeve is used. Such sleeve must be disposed substantially entirely around the periphery of the run of pipe being tapped and, accordingly, in view of their usual size and bulk, are awkward and cumbersome to install.

Typically, at the location where the run of pipe has been tapped, the tapped opening tends to weaken the strength of the pipe so as to expose the pipe to possible breakage at that location.

As disclosed herein, a tapping sleeve has been provided which is relatively easily manufactured, installed and which further serves to lend support to the weakened walls of the pipe being tapped.

SUMMARY OF THE INVENTION AND OBJECTS

In general, there has been provided an improved tapping sleeve of a type having a plurality of semi-flexible bands to be clamped about a cylindrical pipe for forming a fluid connection into the pipe. The bands are disposed about the pipe with pairs of ends of the bands located in closely spaced adjacent positions. Means for securing the bands against the pipe includes lugs in the form of oppositely facing formed grooves disposed on adjacent ends of the bands. Each of the grooves includes openings to receive the shank of T-shaped clamping bolts. One of the formed grooves is uncovered along its length and includes a number of spaced slots each extending in the direction of the length of its band to facilitate assembly by permitting the shank of the bolts to swing into these open slots and the heads to be seated in adjacent groove positions. A rigid bar having spaced bolt openings therealong lies welded across the other one of the adjacent grooves so as to cover it at a selected angle for seating nuts carried on the upper ends of the clamping bolts. The bolts extend upwardly via the aligned slots of the adjacent grooves and through the bolt openings of the bar. The angle of the bolts applies a component of the bolt-tightening force to act in a direction substantially 90° to the band at the point of connection thereto so as to force the bands against the pipe to provide support to the sides of the pipe. The other one of the grooves is formed to receive, in seated relation, the cross-head portion of the T-bolts so as to permit the stem of the bolts to pivot toward the pipe when nuts are tightened onto the bolts.

Utilizing the foregoing (wrap-around) construction, many different diameters can be accommodated with the same unit so as to minimize the previously large inventory required to be stocked without limiting a company's ability to supply proper tapping sleeves for the full range of pipe diameters anticipated. For example, asbestos cement or cast iron pipe having different outside diameters can be tapped using the same size of unit.

It is a general object of the present invention to provide an improved tapping sleeve and more particularly to provide a tapping sleeve which is easily manufactured, installed and which lends strength to the region of the pipe which is tapped.

The foregoing and other objects of the invention will become more readily apparent from the following detailed description of a preferrd embodiment.

In general, a split tapping sleeve of a type having a broad annular, elongate gasket within has been provided herein whereby the upper bearing surfaces of lugs carried by the top half of the tapping sleeve can be readily varied so as to be inclined at various angles. Thus, the lugs of the lower half of the sleeve are drawn upwardly with a force acting along a line substantially tangent to the pipe while the upper ends of the clamping bolts extend slightly outwardly of the tapping sleeve assembly to provide a moderate compression of the top of the shell. In this way the top half of the tapping sleeve is caused to wrap about the pipe into which entry is being made and to seat the sides of the gasket firmly against pipe of various outside diameters.

In addition to the above, the split tapping sleeve disclosed herein includes a formed gasket seat whereby the whole band unit, both top and bottom, can be made in a single pressing operation. Accordingly, the cost of manufacture of a tapping sleeve as described herein is substantially reduced from previous tapping sleeves heretofore known, and the thickness of the body metal will not be reduced by grooving to form a gasket seat as in present units. This permits a thinner body metal to be used, as the thickness at the gasket seat determines the resistance to corrosion and other deterioration of such a unit.

Manufacture of the disclosed sleeve is simplified considerably since both halves of the sleeve are initially identical up to the final welding of bars 26 and forming outlet 14. Inventory and tooling expense can both be reduced.

In addition, it will be evident that the installation of a tapping sleeve as disclosed becomes highly simplified by comparison to prior devices. This is particularly important considering the awkward underground circumstances in which tapping sleeves are normally installed.

Here the top half of the sleeve with bolts inserted in bars 26 may be placed on the pipe. The bottom half is then lifted on one side so that the Tee heads of bolts 21 can swing into open slots in the lower half section of the sleeve assembly. Then, the other side of the lower sleeve half is lifted and bolted in the same manner. Bolts need not be threaded up through both sleeve halves simultaneously as is the present practice.

BRIEF DESCRIPTION OF THE DRAWINGS

FIG. 1 is a perspective view of a split tapping sleeve according to the invention;

FIG. 2 is an end elevation view partially in section of the tapping sleeve as shown in FIG. 1 as viewed from the left;

FIG. 3 shows an enlarged detail section view taken along the line 3—3 of FIG. 1.

DETAILED DESCRIPTION OF A PREFERRED EMBODIMENT

A tapping sleeve assembly 10 of a type which is used for the purpose of connecting a lateral or branch line to a main is comprised of upper and lower semi-cylindrical, semi-flexible bands or half-shells 11, 12.

The top half-shell 11 of assembly 10 carries, centrally located, a radially extending tubular flanged outlet member 14. A formed gasket seat 13 is defined at the juncture between outlet member 14 and band 11 and seats gasket 15 therein. Flange 16 on outlet member 14 facilitates connection with a lateral pipe or it can also have a plain end, threaded end of a half-coupling end depending on the type of connection that is to be made. After tapping sleeve assembly 10 is installed, an opening or flow passage 17 is formed through the side of the main run of pipe 18 in alignment with the axis of outlet member 14.

Each end margin of band 11 parallel to the central axis of sleeve assembly 10 is formed as a lug portion 19 for holding a plurality of bolts 21 utilized to secure tapping sleeve assembly 10 to a pipe. Bolts 21 extend through openings in lugs 19 consisting of holes 31 in bar 26 aligned with the slots 23 as noted below.

As shown in the disclosed embodiment, bolts 21 are used in combination with the bottom band 12 which is also formed with lug members 22 similarly disposed.

The bore of the tubular flanged outlet member 14 extends in alignment with opening 17 (to be later formed through pipe 18) and the sealing means, such as gasket 15.

Lugs 19 and 22 provide oppositely facing formed grooves disposed at the adjacent ends of the semi-flexible bands forming shells 11, 12. Thus, the adjacent end edge margins of bands 11, 12 are turned radially outwardly and mutually away from each other to form lugs 19, 22. The lugs include a number of spaced aligned slots 23, 24 having a width sufficient to accommodate entry of the stem portion 21a of bolts 21.

Accordingly, slots 23, 24 extend in the direction of the length of their respective related bands and are disposed at intervals along the length of the outwardly turned grooves in the lugs.

An elongate, rigid, substantially flat bar 26 bridges the groove of lugs 19 between the outer edge 27 and the outer surface 28 of the top shell 11. At these two locations, bar 26 is welded in fixed relation at a selected angle 29 as will be described further below.

Bar 26 includes a series of openings 31 disposed at a spacing corresponding to the spacing defined between slots 23 (or 24) so as to be aligned with the slots of both the adjacent band ends for the top and bottom shells 11, 12. In this manner, lugs 19 are formed with an upwardly facing bearing surface of bar 26 disposed and serving to orient nuts 33 to lie in the plane 32 substantially normal to a plane 34. Plane 34 is taken through the downwardly facing pivot surface 36 of the groove in lug 22 and simply spaced (by the thickness of band 12) in parallel relation from a plane tangent to pipe 18 at the radius 37 extending from the axis of pipe 18 through bearing surface 36.

As a tapping sleeve assembly 10 of the type described herein is to be installed, the T-bolts are entered upwardly through their respective openings 31 in bar 26 and nuts 33 applied loosely. After disposing the lower half-shell 12 beneath the pipe, the top half-shell is lowered into position onto the pipe whereby it is relatively easy for the depending T-head of bolts 21 to be swung toward the pipe and beneath the downwardly turned edge of lug 22. Once the T-head is located properly in position beneath lug 22, and preferably starting with the center-most bolts, the bottom half-shell 12 can be lifted relatively easily, simply by tightening nuts 33 on the center bolts.

When sleeve assembly 10 is to be mounted on a line full of water under pressure, the upper and lower half-shells are first mounted in place as above described and the fastening bolts tightened securely. Then, before making the opening 17, a gasketed blind flange or a valve is attached to outlet 14 and a source of water under pressure applied through the boss plug 38. This enables a hydrostatic pressure test to be made of the seal formed between pipe 18 being tapped and the upper half-shell 11. If seal 15 is satisfactory and no leakage occurs, the conventional tapping valve and drilling machine can be installed to make the tapping hole 17 in the pipe.

As noted above, bars 26 can be variously disposed with respect to forming an angled bearing surface as defined by their plane 32. The greater angle 29 becomes, the greater will be the tendency for the bolts 21, when tightened, to draw their related band end portions radially inwardly toward pipe 18 as indicated by arrows 39 so as to lend support to the pipe wall. This support compensates, to some extent, for any weakening of the pipe by virtue of having formed opening 17 into the pipe.

Thus, the selected angle of plane 32 defined by bar 26 serves to seat nuts 33 carried on the upper end of bolts 21 extending upwardly via slots 23, 24 and openings 31 in a manner so as to direct a component of the tightening force applied to the bolts to act in a direction providing support to the pipe.

From the foregoing, it will be readily evident that a split tapping sleeve of the foregoing type provides easy installation and permits a manufacturer to maintain a limited inventory of sizes since the angle of bars 26 can be readily varied to accommodate the pipe diameter for which the tapping sleeve is to be used.

From the foregoing, it will be readily evident that the individual bars 26 can be tipped at various angles as desired, and, in this way, notwithstanding the fact that the cross-head of the bolt will remain relatively close to the pipe periphery so that the tightening forces in the bolt are always applied along a line substantially tangent to the pipe, the upper ends of the bolts are directed outwardly to a limited degree, dependent upon the angle 29, so as to cause a moderate compression of the top half 11 of sleeve assembly 10, and, in this manner, cause it to wrap tightly about pipe 18.

In addition to the above, it will also be readily evident that a split ring tapping sleeve of the kind described can be readily installed by a single man simply by first preparing the upper half-shell 11 with its bolts threaded into their respective openings 31 with nuts 33 attached and then swinging the cross-head of the middle bolt on each side into engagement with the lower lug on half-shell 12. At that point, the bottom shell 12 will be suspended from the center bolts and the remaining bolts can readily be attached in the same manner.

Subsequent tightening causes the two sections 11, 12 to be drawn tightly together.

We claim:

1. In a tapping sleeve of a type having a plurality of bands to be clamped about a cylindrical pipe for forming a fluid connection into said pipe, said bands being disposed about said pipe with pairs of ends of the bands disposed in closely spaced adjacent positions, the end edge margin of one band being formed to extend radially outwardly and in overfolded relation spaced from the outer surface of its band, the end edge margin of another band being formed to extend radially outwardly and in overfolded relation spaced from the outer surface of its band and folded reversely to the first named end edge margin, said folded edge margins forming oppositely facing open grooves, means securing said bands against said pipe comprising said oppositely facing open grooves on said adjacent ends of said bands, each of said grooves having openings therein spaced at intervals along the length of the grooves, a rigid bar formed with openings therethrough welded to the end edge of one of said bands and to the outer surface of the band to span across one of said grooves, the last named said openings being aligned with the first named openings, T-bolts extending upwardly via said aligned openings, said bar being disposed across said one groove to lie at a selected angle for seating nuts carried on the upper ends of said bolts so as to provide a component of the tightening force applied to the bolts to act in a direction serving to cause portions of one of the bands to provide support to the pipe, the other one of said grooves being formed to receive, in seated relation, the cross-head portion of said T-bolts so as to permit the stem of the bolts to pivot toward the pipe when nuts are tightened onto the bolts.

2. In a tapping sleeve of a type for forming a branch opening into a run of pipe having a band adapted to wrap partly around the circumference of said pipe and having an opening formed through the band for leading into a branch line extending transversely of the axis of said pipe, a branch line connection carried by said band to be aligned with said opening, a resilient seal disposed coaxially of said opening at the margin bordering the opening in position to be pressed against the exterior of said run of pipe to form a seal around a tapping opening extending through the wall of said pipe, lugs formed on the ends of said band comprising slots spaced along the end edge margin of each end of said band, said end edge margins being formed to extend radially outwardly and reversely in overfolded relation with respect to the outer surface of said band and spaced therefrom to dispose the end edges of said band spaced from the exterior surface of said band, an elongate bar formed with openings therein spaced at intervals corresponding to the spacing between said slots and welded to said end edge and the outer surface of said band with said slots and the openings of said bar aligned to receive bolts therethrough, another elongate band disposed to wrap about said run of pipe, the ends of the last named said band including slots therein extending lengthwise of said band, the ends of the last named band being arcuately turned radially outwardly and reversely away from said end edge margin to form spaced retaining folds open from beneath, and T-shaped bolts each having an elongate stem to extend upwardly via the aligned slots and bar openings and a transversely extending cross-head to be retained in said folds, and nuts carried on the other end of said bolts to be taken up against said bar for drawing the adjacent ends of said bands together.

3. In a split tapping sleeve of a type to be clamped about a cylindrical pipe for forming a fluid connection laterally into said pipe and having a plurality of bands to be wrapped about and to conform to the pipe, one of the bands having an opening therein, a tubular outlet member fixed in alignment with said opening, sealing means around said opening between said one band and said pipe to seal escape of fluid, and means securing said bands against the pipe comprising lugs formed on the ends of said bands for drawing adjacent band ends together, said lugs comprising slots formed in each of said adjacent band ends to extend in the direction of the length of the band and spaced at intervals along the end edge of the band, the end edge margin of one of said adjacent band ends being turned radially outwardly and upwardly to an overfolded position relative to the outer surface of its band but spaced therefrom to form a groove along one of said adjacent band ends, the end edge margin of the other one of said adjacent band ends being turned outwardly and away from the last named band end to form a downwardly facing bearing surface open from beneath, the slots of the adjacent band ends being aligned for receiving bolts therebetween, an elongate rigid bar disposed to bridge the first named groove between the end edge of said one band and the outer surface of the band, said bar having openings aligned with the slots of both of said adjacent band ends, said bar having an upwardly facing bearing surface thereon to form a lug, and means for drawing the adjacent band ends toward each other to conform said bands about said pipe, the last named means comprising elongate bolts having a head portion, a threaded stem, and a nut threadedly engaged on the stem, said head portion and nut respectively engaging said first and second named bearing surfaces when said nuts are taken up thereby drawing the adjacent band ends together.

4. In a split tapping sleeve according to claim 3 wherein said other adjacent band end is turned downwardly and away from the lug on said one adjacent band end to form a downwardly facing groove open from beneath and having slots at intervals along the length of said groove to receive the stem of said bolts, said head portion of said bolts forming an elongate transverse member to be received within said downwardly facing groove free to pivot therein about the axis of said elongate transverse head member to permit said stem portion to rock toward said pipe.

5. In a split tapping sleeve according to claim 3 wherein said bar is disposed to orient the bearing surfaces thereof to dispose said nuts to lie in a plane substantially normal to a plane taken through said downwardly facing bearing surface and spaced by the thickness of said band in parallel relation from a plane tangent to said pipe at the radius extending from the axis of the pipe through said downwardly facing bearing surface.

6. In a split tapping sleeve according to claim 3 comprising a formed gasket seat around said opening and adjacent said outlet member in said one band, both of said bands, including the region of said seat being of substantially uniform thickness.

* * * * *